United States Patent
Greer

(10) Patent No.: US 10,118,297 B2
(45) Date of Patent: Nov. 6, 2018

(54) ANALYSIS OF END EFFECTOR OPERATIONS BY A ROBOT

(71) Applicant: The Boeing Company, Chicago, IL (US)

(72) Inventor: Christopher A Greer, Wadmalaw Island, SC (US)

(73) Assignee: The Boeing Company, Chicago, IL (US)

( * ) Notice: Subject to any disclaimer, the term of this patent is extended or adjusted under 35 U.S.C. 154(b) by 147 days.

(21) Appl. No.: 15/196,510

(22) Filed: Jun. 29, 2016

(65) Prior Publication Data

US 2018/0001477 A1 Jan. 4, 2018

(51) Int. Cl.
  *B25J 9/16* (2006.01)
  *G05B 19/12* (2006.01)
  *G05B 19/401* (2006.01)
  *G05B 19/425* (2006.01)

(52) U.S. Cl.
  CPC ........... *B25J 9/1692* (2013.01); *B25J 9/1697* (2013.01); *G05B 19/128* (2013.01); *G05B 19/401* (2013.01); *G05B 19/425* (2013.01); *G05B 2219/32025* (2013.01); *G05B 2219/37097* (2013.01); *G05B 2219/39024* (2013.01); *G05B 2219/45134* (2013.01); *G05B 2219/49327* (2013.01)

(58) Field of Classification Search
  CPC ...... B25J 9/1692; B25J 9/1697; B25J 9/1679; G05B 19/128; G05B 19/401; G05B 19/425; G05B 2219/32025; G05B 2219/37097; G05B 2219/39024; G05B 2219/45134; G05B 2219/49327; G05B 2219/4932
  See application file for complete search history.

(56) References Cited

U.S. PATENT DOCUMENTS

| | | | | |
|---|---|---|---|---|
| 4,764,987 A | * | 8/1988 | Drei | A41H 3/00 101/368 |
| 5,380,978 A | * | 1/1995 | Pryor | B23K 26/032 219/121.64 |
| 5,682,657 A | * | 11/1997 | Hirose | B21D 28/12 101/3.1 |
| 9,740,191 B2 | * | 8/2017 | Troy | G05B 19/402 |

(Continued)

FOREIGN PATENT DOCUMENTS

| DE | 102013110667 A1 | 3/2015 |
|---|---|---|
| JP | H1110598 A | 1/1999 |

OTHER PUBLICATIONS

European Search Report EP17178850; dated Dec. 19, 2017.
(Continued)

*Primary Examiner* — Rachid Bendidi
(74) *Attorney, Agent, or Firm* — Duft & Bornsen, PC

(57) ABSTRACT

Systems and methods are provided for placing non-destructive marks onto a part via an end effector of a robot. One embodiment is a system comprising an end effector of a robot. The end effector includes an extendable punch that places targets onto a part, and supports that hold a strip of reflective adhesive tape between the punch and the part. Extending the punch cuts out a target from the strip and applies an adhesive side of the target to the part, and retracting the punch leaves a reflective side of the target visible on the part.

23 Claims, 11 Drawing Sheets

(56) References Cited

U.S. PATENT DOCUMENTS

| | | | | |
|---|---|---|---|---|
| 2010/0010660 A1* | 1/2010 | Salour | ............... | G05B 19/402 |
| | | | | 700/117 |
| 2012/0327187 A1* | 12/2012 | Troy | ............... | G01N 29/0654 |
| | | | | 348/46 |
| 2014/0375794 A1* | 12/2014 | Singh | ............... | B01J 19/121 |
| | | | | 348/95 |

OTHER PUBLICATIONS

Wikipedia article; Photogrammetry May 5, 2016, https://en.wikipedia.org/wiki/Photogrammetry.
Wikipedia article; Retroreflector May 5, 2016, https://en.wikipedia.org/wiki/Retroreflector.

* cited by examiner

ANALYSIS OF END EFFECTOR OPERATIONS BY A ROBOT

FIELD

The disclosure relates to the field of robotics, and in particular, to tracking the movement of an end effector of a robot.

BACKGROUND

Robots enhance the predictability and accuracy of manufacturing processes, by reliably and repeatedly performing work upon parts (e.g., composite carbon fiber parts, steel parts, etc.) via an end effector in order to drill holes, place rivets, etc. This enhanced predictability helps to ensure that the fabrication of complex parts is performed in an expected manner and without undesirable out-of-tolerance inconsistencies.

While robots are effective tools for performing work upon complex parts consistently, the training process for robots may be time-consuming and expensive. Robots are often governed by Numerical Control (NC) programs, which guide the actions of the robot to move an end effector of the robot to a desired location, in order to perform work upon a part via the end effector as desired.

Even an NC program that is theoretically perfect is subject to error when implemented in a real-world scenario. For example, forces applied by a dressing (e.g., cabling, etc.) for the robot may cause the robot to be subject to minor errors in movement when the robot is actuated. Similarly, if the NC program quickly changes the speed of the robot, positional error may accrue as acceleration and deceleration apply unexpected forces to the frame of the robot. For these and other reasons, it is not uncommon for experts training a robot to direct the robot to perform work upon multiple parts as part of a training process. The parts are disposed after they are worked upon by the robot, and errors in the location of work performed upon the parts is then detected by an operator and utilized to modify the NC program. Accordingly, those skilled in the art continue with research and development efforts in the field of robotic fabrication.

SUMMARY

Embodiments described herein engage in non-destructive training of robots that utilize end effectors. Specifically, training end effectors are proposed which may be utilized in place of the end effector normally utilized by the robot. These training end effectors may apply a visible mark to a part being fabricated, without physically altering the part itself. In this manner, a robot may train multiple times on a single part in order to tune an NC program for the robot, and without damaging the part being fabricated. In fields that utilize particularly expensive parts (e.g., the aerospace and aeronautics industry), this results in substantial cost savings.

One embodiment is a system comprising an end effector of a robot. The end effector includes an extendable punch that places targets onto a part, and supports that hold a strip of reflective adhesive tape between the punch and the part. Extending the punch cuts out a target from the strip and applies an adhesive side of the target to the part, and retracting the punch leaves a reflective side of the target visible on the part.

Another embodiment is a method for operating an end effector of a robot. The method includes identifying locations indicated by a Numerical Control (NC) program for permanently altering a part, and placing, via an end effector of a robot in accordance with the NC program, non-destructive marks onto the part at each of the locations indicated by the NC program. The method also includes comparing the locations of the marks to desired locations for permanently altering the part, and determining an accuracy of the NC program prior to permanently altering the part.

Another embodiment is a non-transitory computer readable medium embodying programmed instructions which, when executed by a processor, are operable for performing a method for operating an end effector of a robot. The method includes identifying locations indicated by a Numerical Control (NC) program for permanently altering a part, placing, via an end effector of a robot in accordance with the NC program, non-destructive marks onto the part at each location indicated by the NC program, and comparing the locations of the marks to desired locations for permanently altering the part. The method also includes determining an accuracy of the NC program prior to permanently altering the part.

Another embodiment is a method. The method includes placing, via an end effector, non-destructive marks onto a part at each location where a Numerical Control (NC) program indicates that the part will be permanently altered, and comparing locations of the marks to desired locations for permanently altering the part. The method further includes determining an accuracy of the NC program prior to permanently altering the part.

Another embodiment is a system. The system includes a robot comprising a marking element that applies non-destructive marks to a part, and a controller that directs the marking element to apply the non-destructive marks at each location where a Numerical Control (NC) program indicates that permanent alterations will be made on the part.

Other exemplary embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific exemplary embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
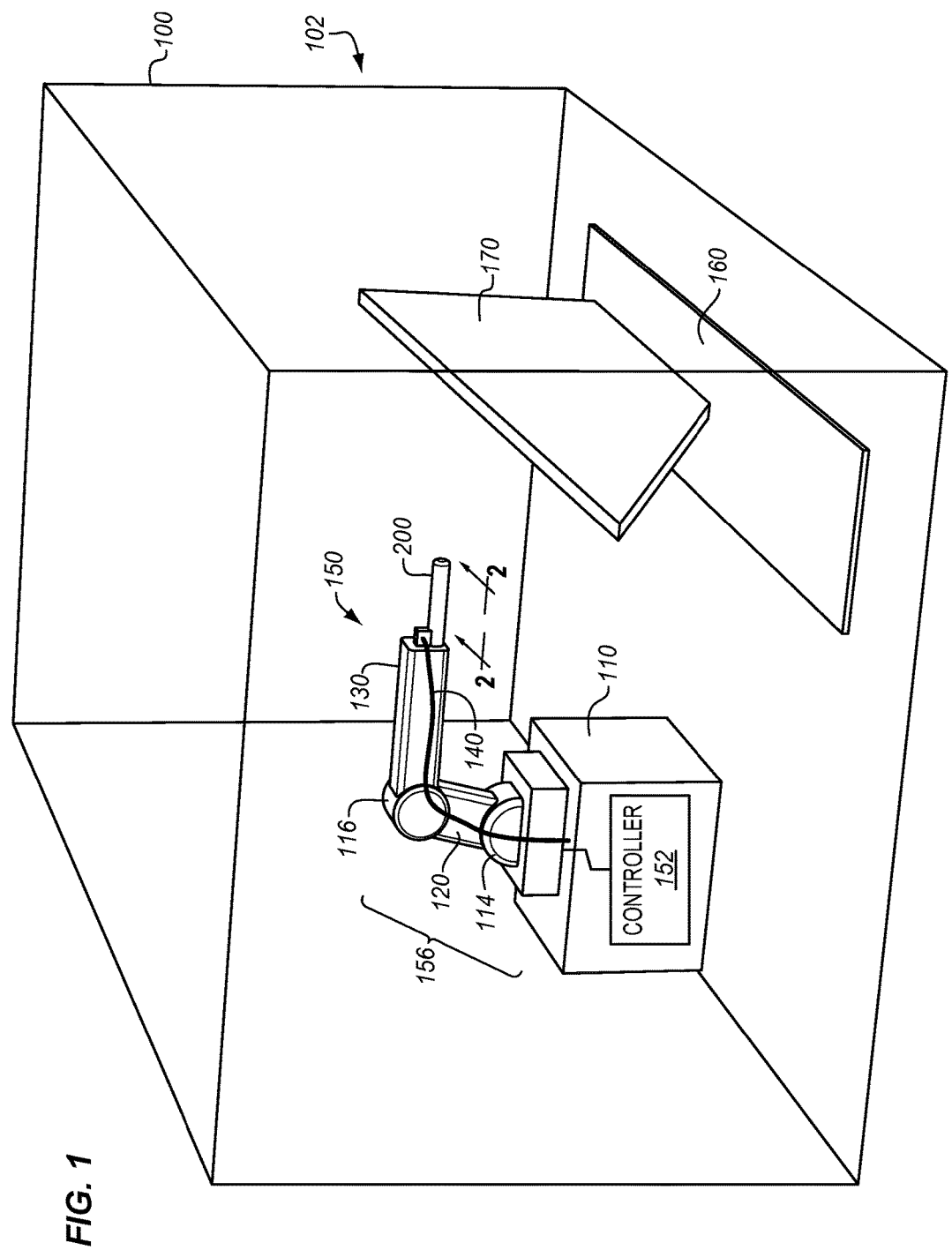
FIG. 1 is a diagram of a robot in an exemplary embodiment.

FIG. 1 is a block diagram of a robot 150 within a manufacturing cell 100 in an exemplary embodiment. Manufacturing cell 100 comprises any volume of space in which robot 150 is expected to operate to facilitate manufacturing, fabrication, and/or assembly of incoming parts. For example, manufacturing cell 100 may comprise an enclosed space, or an open volume of space on a factory floor. According to FIG. 1, manufacturing cell 100 includes volume 102, base 110, robot 150 mounted to base 110, conveyor 160, and part 170. Base 110 may comprise a structural component occupying a fixed location within manufacturing cell 100, or may comprise a mobile feature (e.g., a cart) capable of being driven across the factory floor in order to arrange robots and/or tooling into various configurations as desired. Thus, in some embodiments base 110, part 170, and conveyor 160 are mobile and/or drivable across the factory floor. Robot 150 is mounted to base 110, and includes multiple actuators (114, 116) and rigid bodies (120, 130) which together define a kinematic chain 156. Robot 150 also includes end effector 200, which is capable of performing work upon part 170. Dressing 140 provides power and/or communications cabling, hydraulics, etc. to robot 150 in order to facilitate the operations of robot 150.

An end effector of robot 150 may be utilized to perform work on part 170 that permanently alters part 170 in order to fabricate part 170. For example, an end effector may comprise a saw, drill, rivet gun, etc. However, in this embodiment end effector 200 is distinguished from such end effectors described above that are used during fabrication. Specifically, end effector 200 applies non-destructive marks to part 170, instead of performing work that permanently alters part 170. When end effector 200 applies these marks at locations where work will be performed by another end effector, the marks may be analyzed and reviewed to ensure that robot 150 will perform work upon part 170 accurately and within tolerance. This eliminates the need to perform work upon multiple parts (which may potentially render those parts unusable) in order to train robot 150 to properly perform fabrication processes.

Controller 152 directs the operations of robot 150, including end effector 200. For example, controller 152 may direct actuators 114 and 116 of kinematic chain 156 in accordance with a Numerical Control (NC) program in order to reposition end effector 200 as desired. Controller 152 may be implemented, for example, as custom circuitry, as a processor executing programmed instructions, or some combination thereof.

Part 170 may comprise any suitable structure configured to be worked upon by end effector 132. For example, part 170 may comprise a metal or cured composite panel for an aircraft wing, a structural component of a fuselage, a strut, etc. Conveyor 160 moves part 170 into manufacturing cell 100, and may comprise an automated means (e.g., a conveyor belt), a cart, or a suitable non-automated means.

Figure 2:
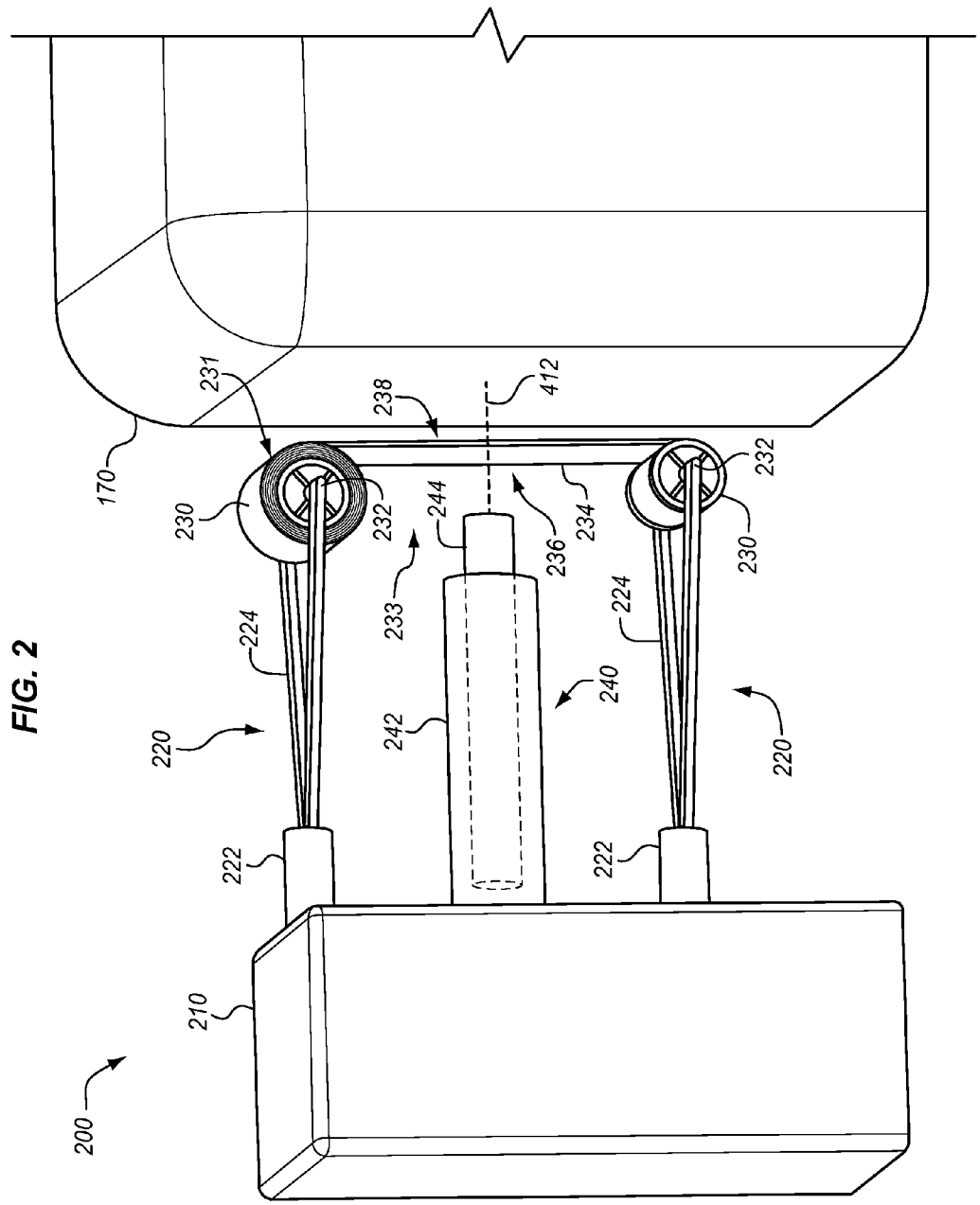
FIGS. 2-5 are diagrams illustrating the operations of an end effector of a robot in an exemplary embodiment.

FIGS. 2-5 are diagrams illustrating the operations of end effector 200 of robot 150 in an exemplary embodiment. FIGS. 2-5 correspond with the view indicated by view arrows 2 of FIG. 1. As shown in FIG. 2, end effector 200 includes base 210, which is attached to robot 150 of FIG. 1. Extending from base 210 are supports 220. Each support 220 includes a foot 222, from which a Y bar 224 protrudes. Y bars 224 support spools 230, upon which a supply 231 of tape 233 may be stored. Spools 230 may be driven by motors/actuators 232 in order to draw tape 233 from supply 231. Supports 220 provide tension between spools 230, which in turn applies tension to strip 234 of tape 233. Strip 234 includes a reflective side 236 (e.g., a side that includes visible retroreflective elements) as well as an adhesive side 238.

Figure 3:
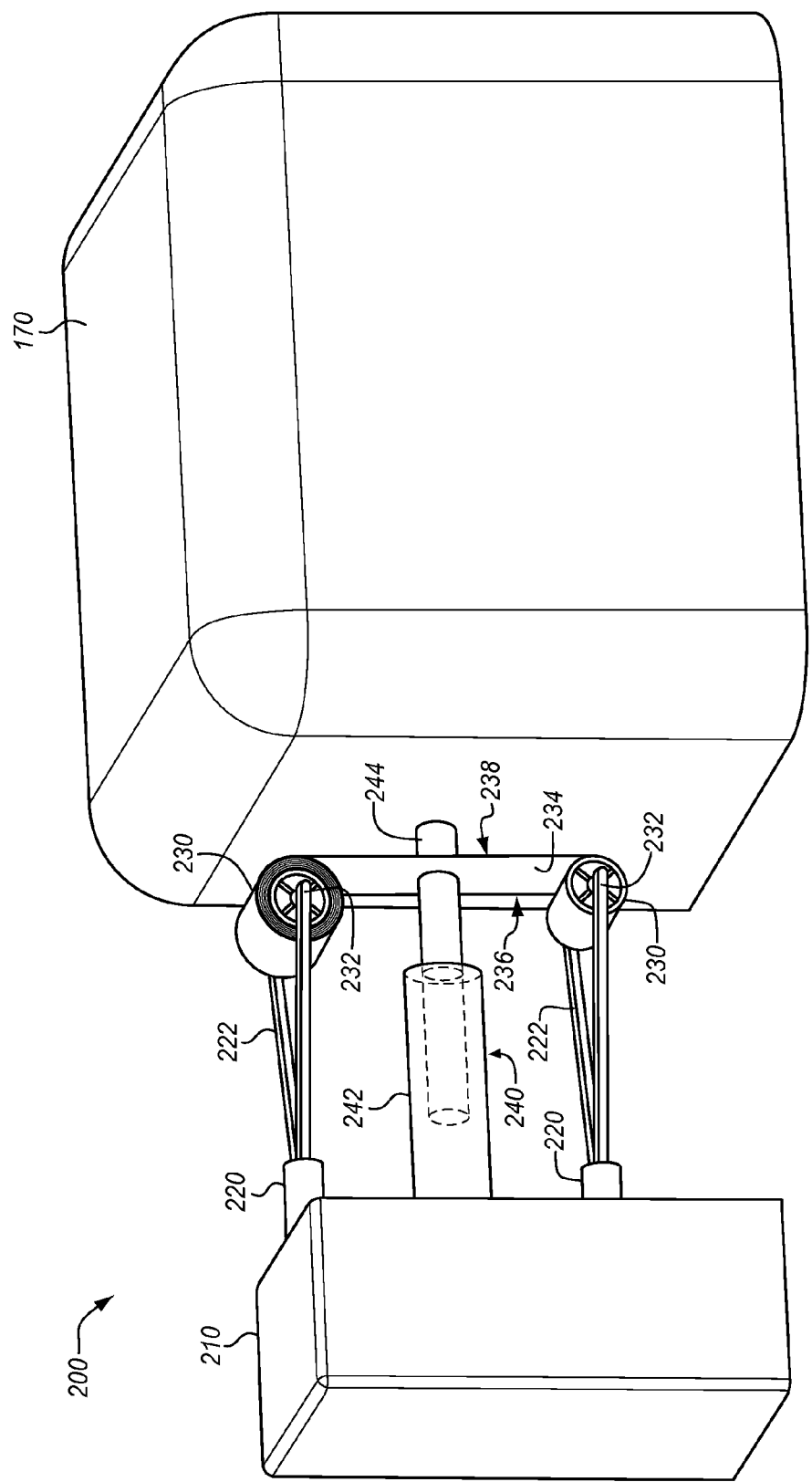
Figure 4:
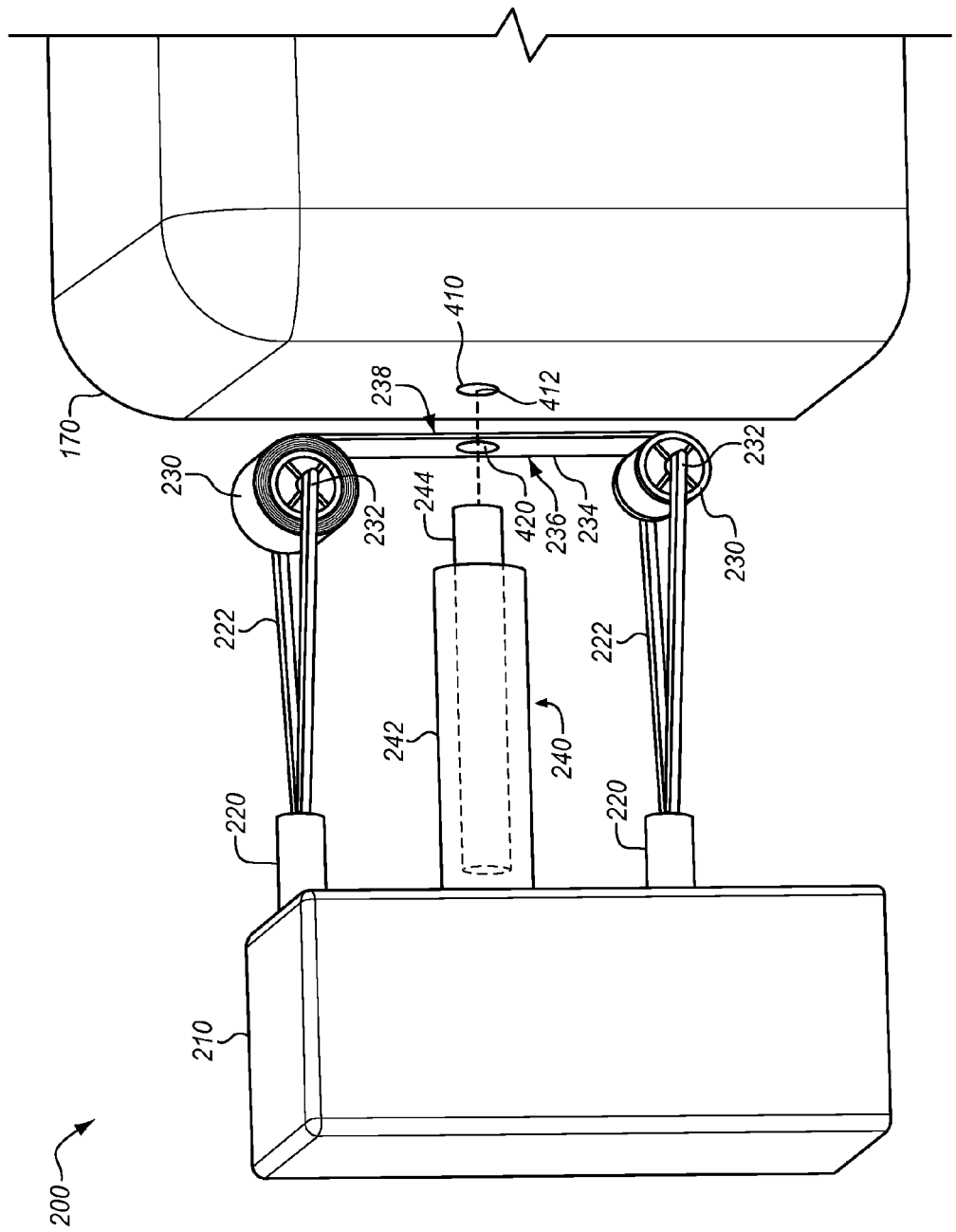
Figure 5:
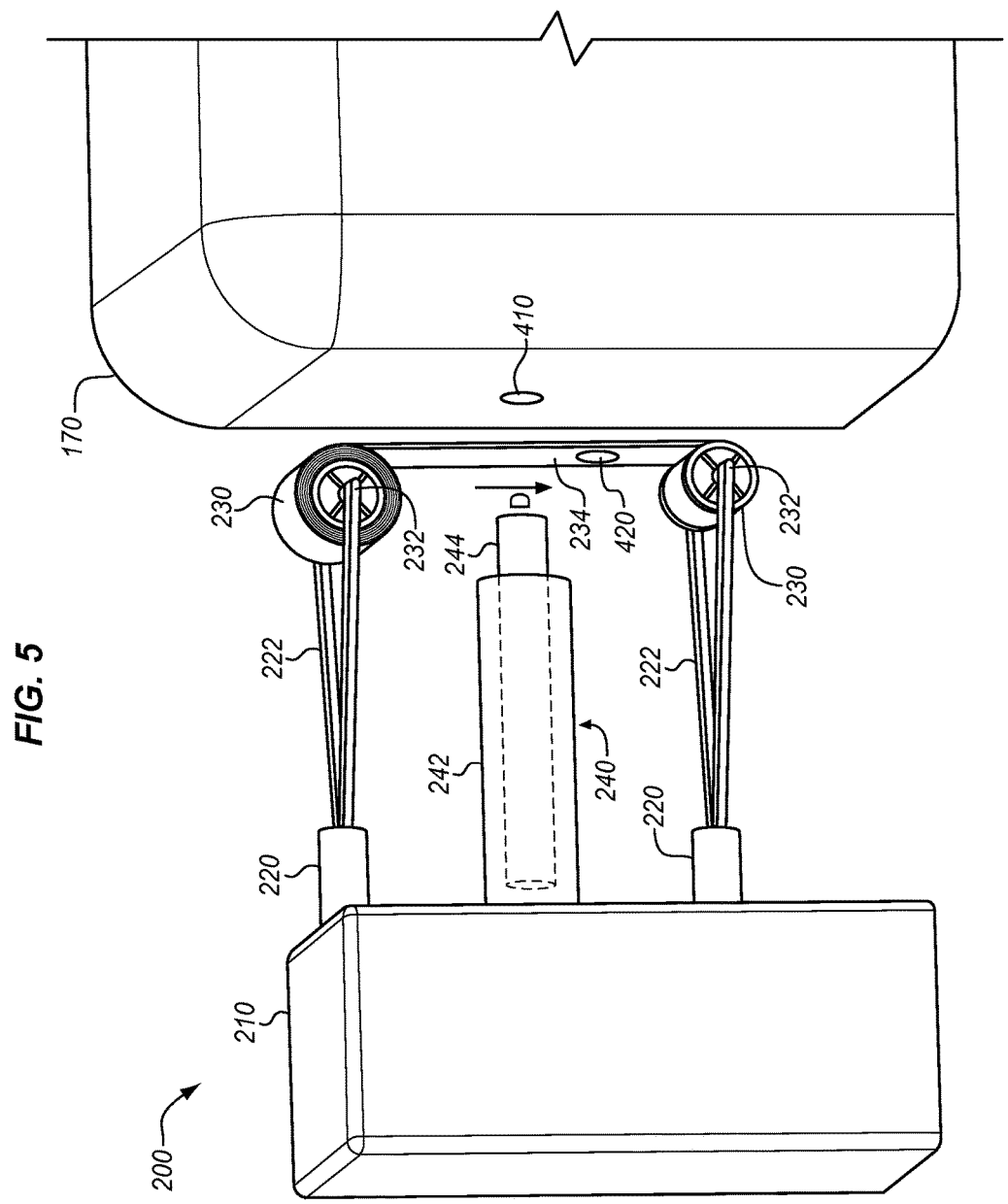

When end effector 200 applies a non-destructive mark to part 170 (e.g., at location 412, it may utilize marking element 240. In this embodiment, marking element 240 includes piston 242 and punch 244. Piston 242 may be utilized to drive punch 244 through strip 234 as shown in FIG. 3. This punches out a reflective (e.g., retroreflective) photogrammetric target (410, of FIG. 4) from strip 234, and further places the target in contact with part 170. Thus, when punch 242 is withdrawn as shown in FIG. 4, target 410 remains in place at (e.g., centered over) location 412, and hole 420 remains at strip 234. In order to enable punch 242 to punch out a new target 410, motors 232 may operate to draw more tape from supply 231, moving additional tape 233 in front of punch 242 (as shown in FIG. 5). End effector 200 may then be repositioned over another suitable location on part 170 for marking.

Figure 6:
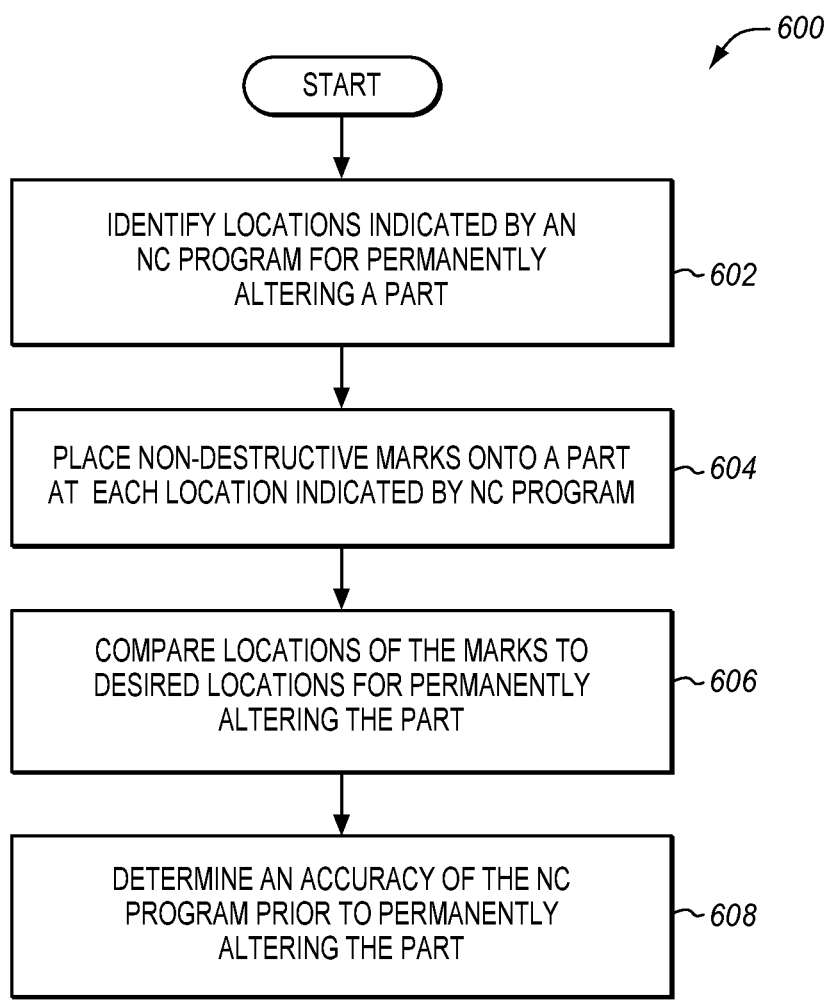
FIGS. 6-7 are flowcharts illustrating methods for operating a robot in an exemplary embodiment.
Figure 7:
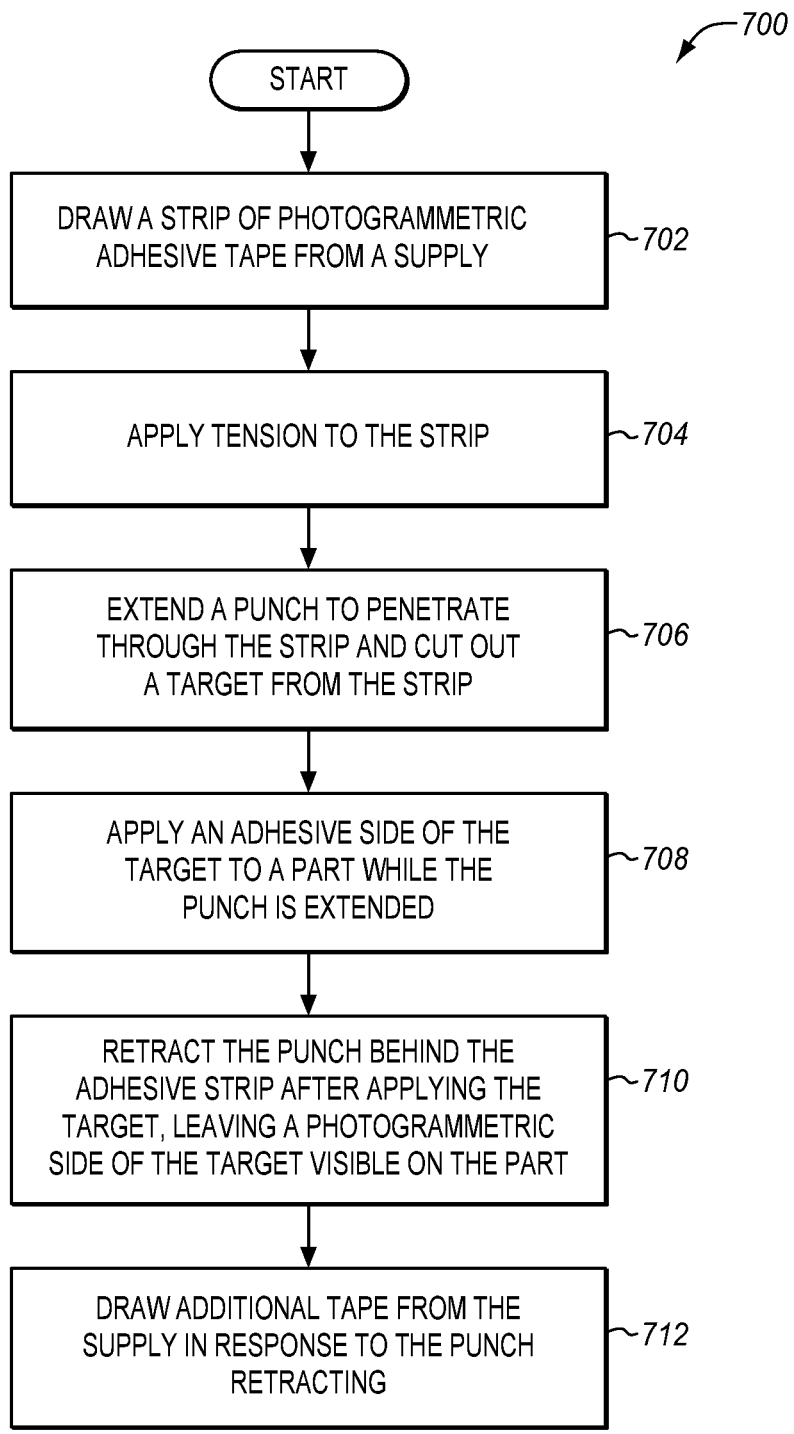

Illustrative details of the operation of robot 150 will be discussed with regard to FIGS. 6-7. FIGS. 6-7 are flowcharts illustrating methods for operating robot 150 in an exemplary embodiment. Specifically, FIG. 6 recites a generalized technique for applying non-destructive marks via an end effector, while FIG. 7 focuses upon operations performed by end effector 200 illustrated in FIG. 2. Assume, for FIG. 6, that robot 150 is currently equipped with an end effector (not shown) that performs work (e.g., drilling, cutting, sawing, riveting, etc.) upon part 170. Further, assume that robot 150 controls the placement of the end effector via an NC program.

FIG. 6 is a flowchart illustrating a method 600 for operating a robot in an exemplary embodiment. The steps of method 600 are described with reference to robot 150 of FIG. 1, but those skilled in the art will appreciate that method 600 may be performed in other systems. The steps of the flowcharts described herein are not all inclusive and may include other steps not shown. The steps described herein may also be performed in an alternative order.

Initially, a first end effector that performs work that permanently alters part 170 (e.g., an end effector that operates as a drill), is replaced with a second end effector (e.g., the end effector 200 shown in detail at FIGS. 2-5) that applies non-destructive marks to part 170. Next, controller 152 directs the second end effector 200 based on instructions in the NC program for the first end effector. This involves identifying locations 412 indicated by the NC program for permanently altering part 170 (step 602). Based on this information, controller 152 causes the second end effector 200 to place non-destructive marks onto part 170 at each location 412 where the NC program indicates that part 170 will be permanently altered (step 604). For example, controller 152 may review instructions in the NC program for the first end effector, and direct actuators (114, 116) of robot 150 to reposition rigid bodies of robot 150 in order to adjust a position of end effector 200 to desired locations indicated in the NC program.

Controller 152 further directs end effector 200 to apply non-destructive marks (e.g., one or more targets 410) onto part 170 at each location where the NC program directs the first end effector to permanently alter part 170 (e.g., by performing work on part 170). After the locations have been marked, controller 152 may analyze the marked locations (e.g. by photogrammetry) and compare the marked locations to desired locations for permanently altering the part (step 606). Then, controller 152 may determine an accuracy of the NC program, prior to permanently altering part 170 (step 608). In this manner, the exact locations that will receive work at part 170 can be precisely located. If there is any error in these locations, the error can be accounted for before work on part 170 is performed at an out-of-tolerance location. For example, controller 152 may compare detected location of marks with desired locations, and revise the NC program based on the comparison. After adjusting the NC program, controller 152 may cause end effector 200 to apply a new mark at a location indicated by the adjusted NC program. Thus, these processes may be performed iteratively to increase the accuracy of the NC program.

FIG. 7 further illustrates specific operations that may be performed by end effector 200 when applying a non-destructive mark. FIG. 7 is a flowchart illustrating a method 700 for operating a robot in an exemplary embodiment. The steps of method 700 are described with reference to end effector 200 of FIG. 2, but those skilled in the art will appreciate that method 700 may be performed in other systems.

Assume, for this embodiment, that controller 152 has positioned end effector 200 over a location indicated in the NC program (as shown in FIG. 2), and further assume that controller 152 has provided an instruction to end effector 200 to apply a non-destructive mark. To this end, motors 232 draw a strip 234 of adhesive tape 233 from supply 231 (step 702). As strip 234 is drawn, supports 220 apply tension to strip 234 to ensure that strip 234 does not droop or sag (step 704). Controller 152 then directs piston 242 to extend punch 244 (e.g., by controlling air logic to apply pressure that extends punch 244 outward) to penetrate through strip 234 and cut out target 410 from strip 234 (step 706) (as shown in FIG. 3). After punch 244 cuts out target 410, it pushes target 410 onto part 170 at location 412. This applies an adhesive side 238 of target 410 to part 170 while punch 244 is extended (step 708).

After target 410 has been adhered to part 170, punch 244 retracts behind adhesive strip 234, leaving a reflective (e.g., retroreflective) side 236 of target 410 visible on part 170 (step 710) (as shown in FIG. 4). Controller 152 then directs motors 232 to draw additional tape 233 from supply 231, in response to punch 244 retracting (step 712) (as shown in FIG. 5). This prepares end effector 200 to apply another target 410 to a new location, the next time punch 244 is extended.

Methods 600-700 provide a benefit over prior techniques, because they allow for an automated robot driven by an NC program to accurately indicate locations at a part which will receive permanent alteration (e.g., work) during fabrication. This allows for rapid detection of whether or not a part will be altered in a manner that is in-tolerance. Furthermore, since the locations are indicated by non-destructive marks (e.g., targets 410), destruction of a part is not required in order to train/adjust the NC program to increase the accuracy of the robot during fabrication. This in turn results in substantial cost savings when training a robot to perform work on expensive parts (e.g., sections of aircraft fuselage).

Figure 8:
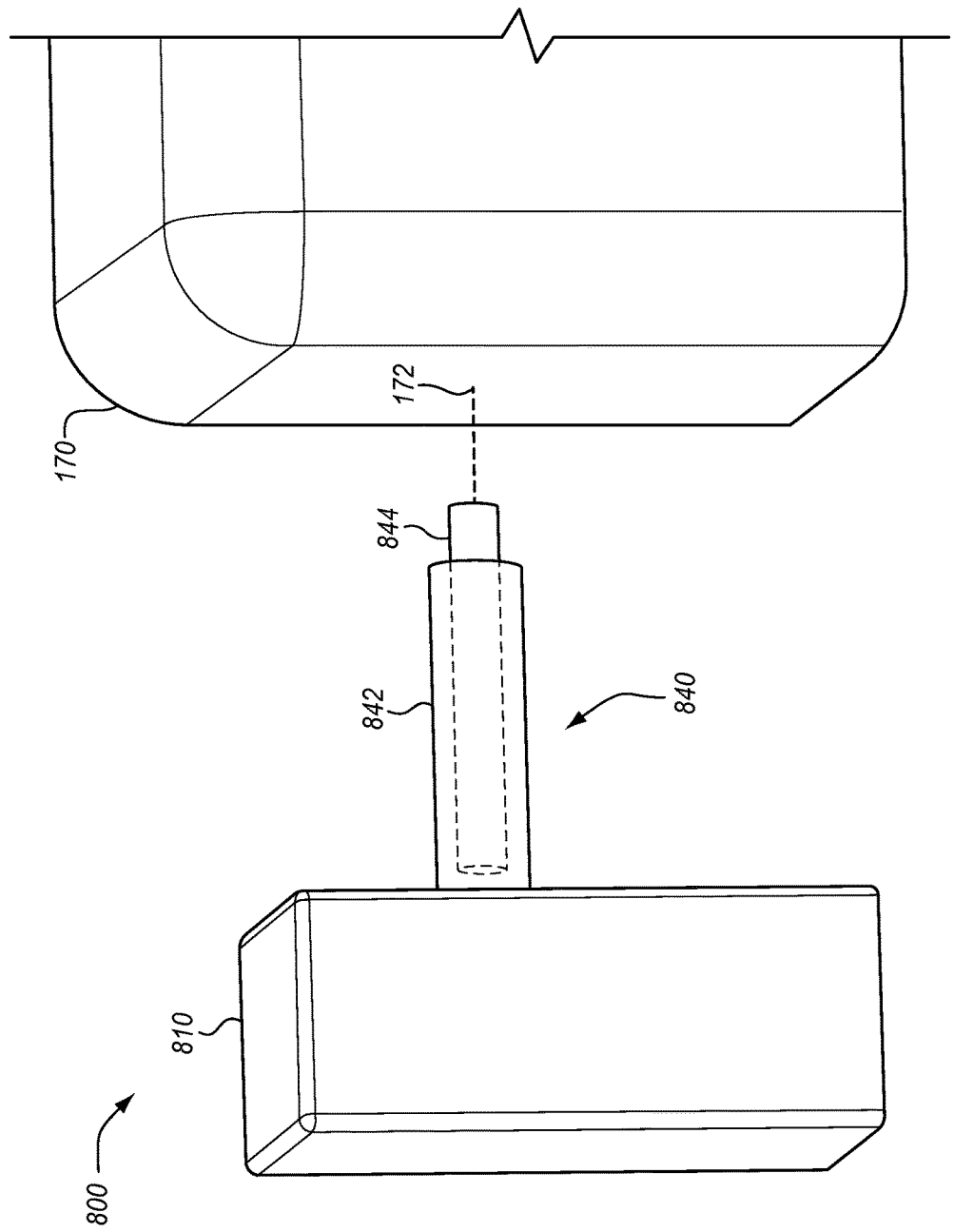
FIGS. 8-9 are diagrams illustrating further end effectors in an exemplary embodiment.
Figure 9:
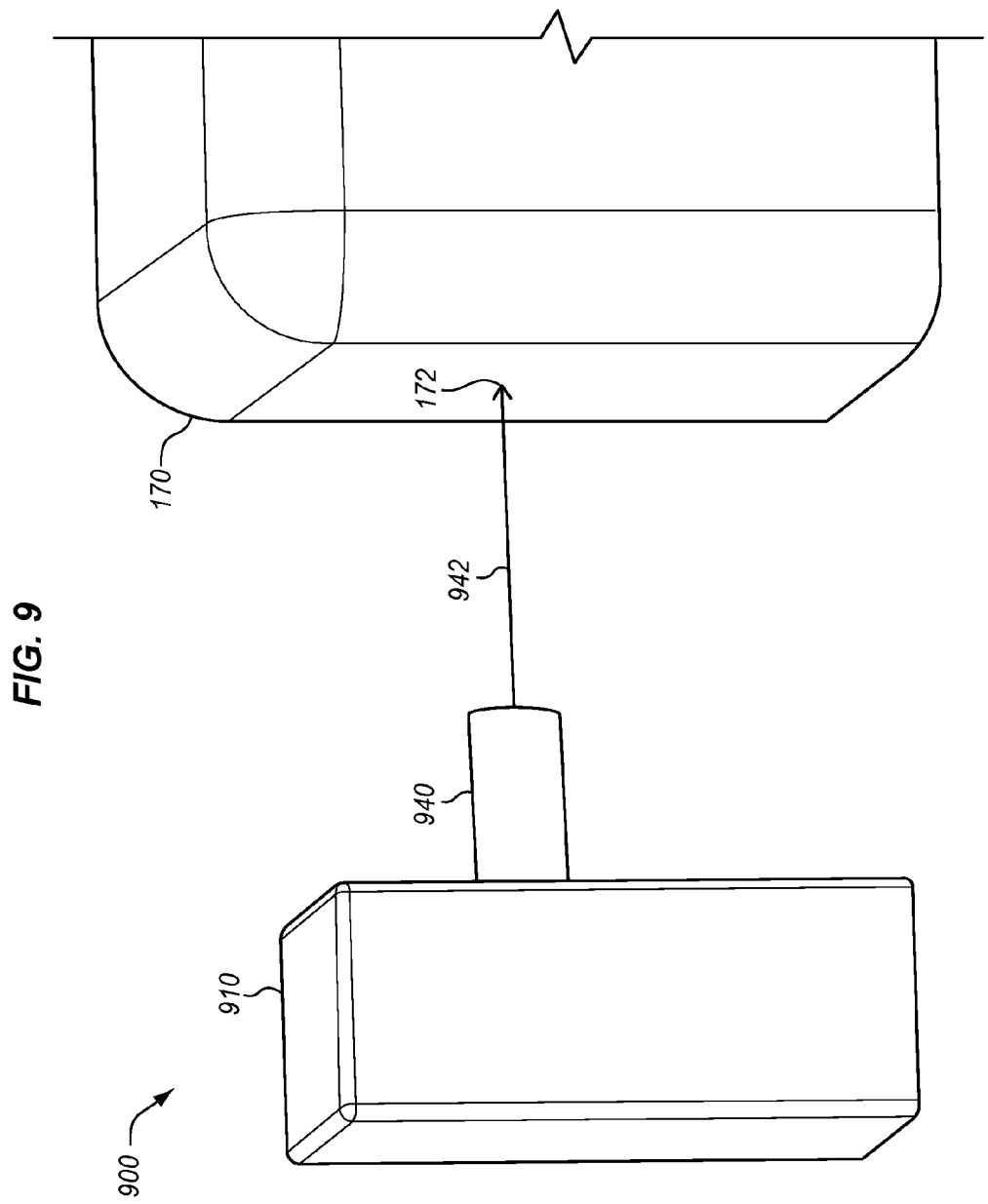

FIGS. 8-9 are diagrams illustrating further end effectors in an exemplary embodiment. These end effectors apply non-destructive marks, and the marks may include physical pieces of removable tape, ink spots applied by a marking device, and/or laser spots placed by a laser. As shown in FIG. 8, an end effector 800 includes base 810 and marking element 840. In this embodiment, marking element 840 comprises piston 842 and ink dispenser 844 (e.g., a felt tip). By extending ink dispenser 844 outward via piston 842, end effector 800 may apply a non-destructive mark onto part 170 at location 172 in accordance with an NC program as an ink spot. Similarly, FIG. 9 illustrates an end effector 900 that includes a base 910 and a marking element 940. In this embodiment, marking element 940 generates light, and provides an illuminating beam (e.g., beam 942 of laser light) to mark location 172 on part 170 as a laser spot. In this embodiment, the illuminating beam provides a temporary mark that only exists while energy is output through marking element 940. This is in contrast with marking elements 840 and 240, which may apply marks that are semi-permanent (e.g., marks that remain until they are removed by an active process performed at part 170). In this manner, part 170 is marked, and the marks are compared to desired locations at which processes will be performed at part 170, in order to confirm that those processes are performed at in-tolerance locations on part 170.

Examples

In the following examples, additional processes, systems, and methods are described in the context of a robot that applies non-destructive marks to a part.

Figure 10:
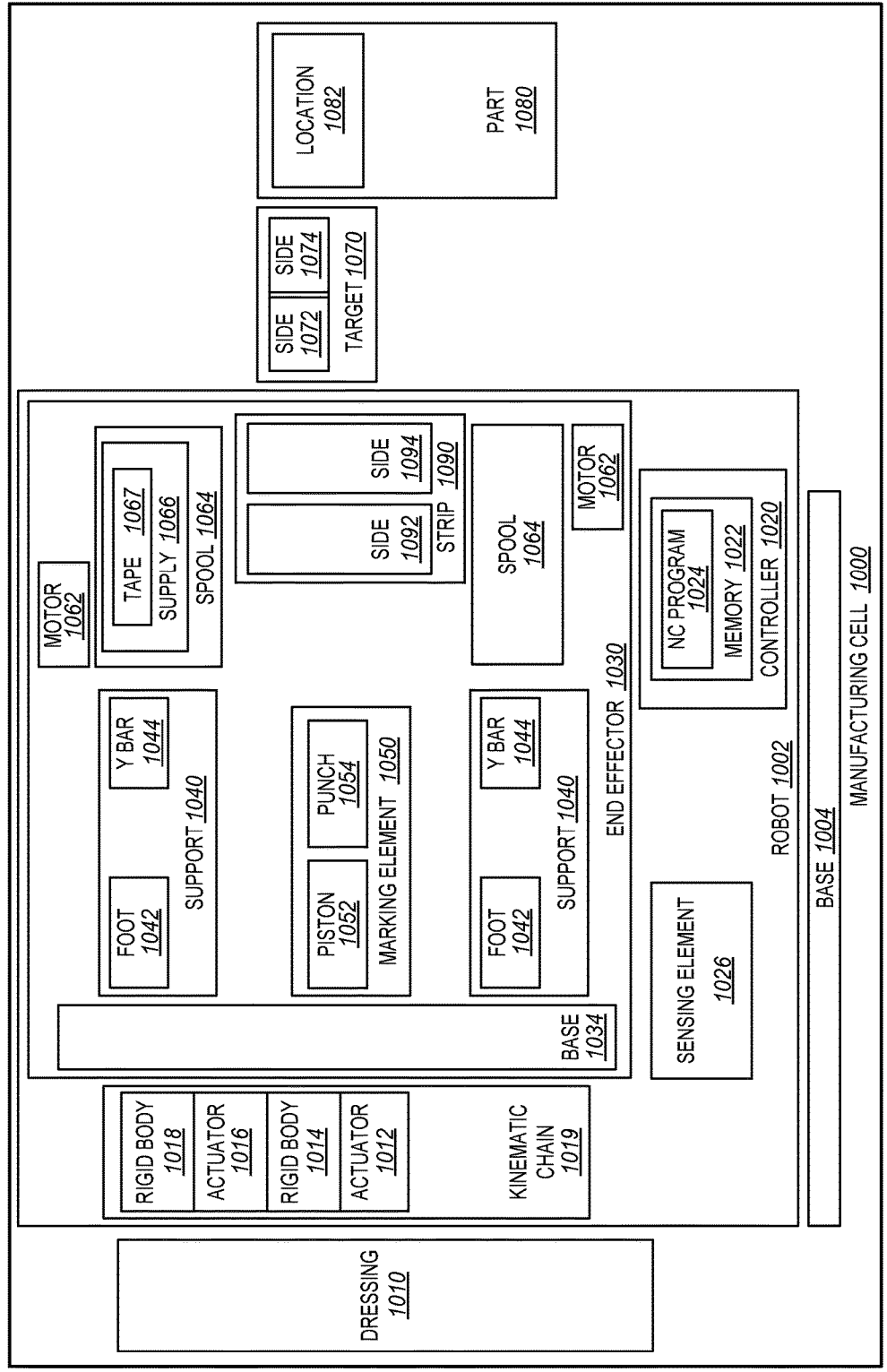
FIG. 10 is a block diagram of a robot in an exemplary embodiment.

FIG. 10 is a block diagram of a robot 1002 in a manufacturing cell 1000 in an exemplary embodiment. Dressing 1010 provides power and/or cabling to robot 1002, and robot 1002 is mounted to base 1004. In this embodiment, robot 10002 is controlled by controller 1020, which includes memory 1022 and NC program 1024. Actuators 1012 and 1016, in combination with rigid bodies 1014 and 1018, form kinematic chain 1019 for repositioning end effector 1030. End effector 1030 is capable of applying a non-destructive mark to part 1080 at location 1082. In this embodiment, end effector 1030 includes base 1034, supports 1040, and marking element 1050. Supports 1040 each include foot 1042 and Y bar 1044. In this embodiment, marking element 1050 includes piston 1052 and punch 1054. Y bars 1044 hold spools 1064, and tension strip 1090 which is placed between spools 1064. Motors 1062 may be utilized to draw from supply 1066 of tape 1067 in order to advance strip 1090. Strip 1090 includes reflective/retroreflective side 1092, as well as adhesive side 1094. Sensing element 1026 (e.g., a camera, 3D camera, Light Detection and Ranging (LIDAR) sensor, etc.) may be attached to end effector 1030, and it utilized to detect the locations of applied marks on part 1080.

When punch 1054 is extended through strip 1090, it cuts out target 1070, which itself includes reflective/retroreflective side 1072, as well as adhesive side 1074. Target 1070 is placed by punch 1054 at location 1082 on part 1080.

Figure 11:
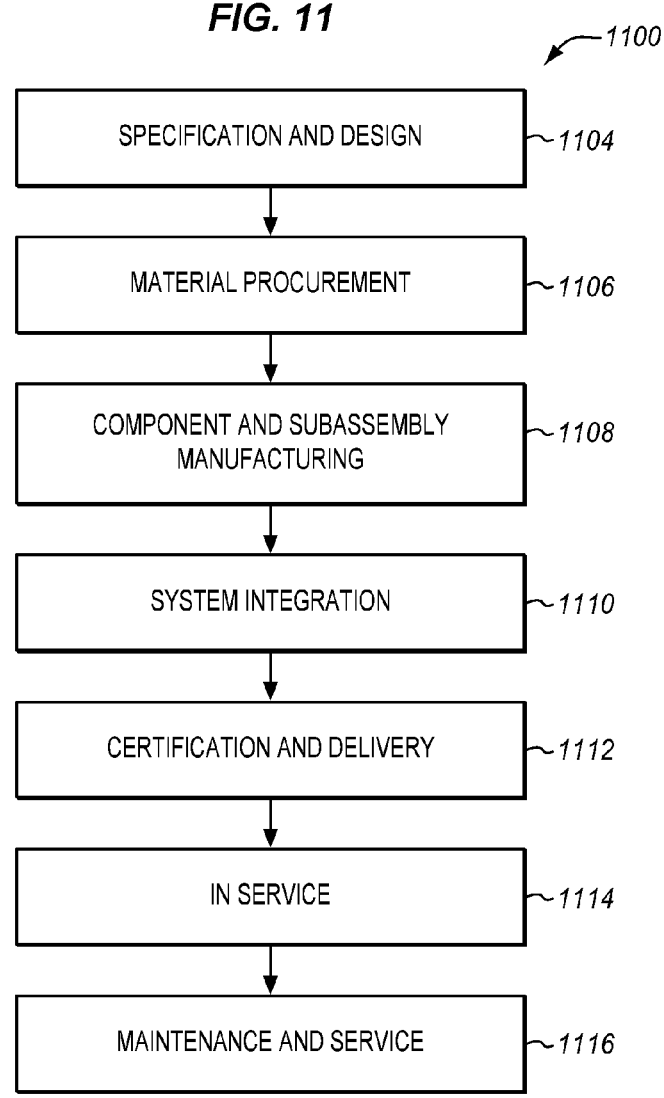
FIG. 11 is a flow diagram of aircraft production and service methodology in an exemplary embodiment.
Figure 12:
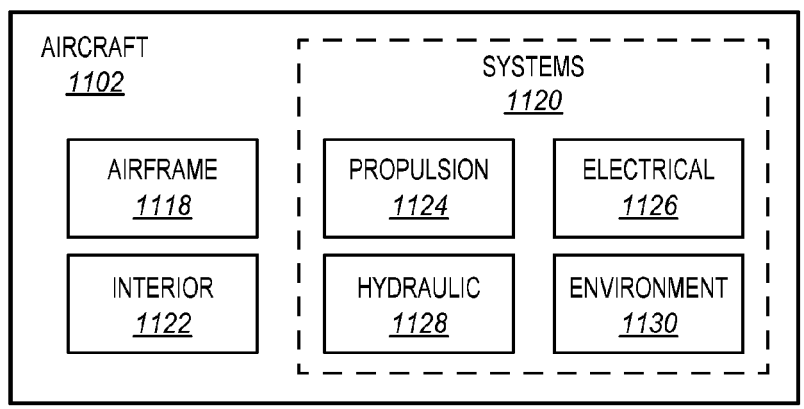
FIG. 12 is a block diagram of an aircraft in an exemplary embodiment.

Referring more particularly to the drawings, embodiments of the disclosure may be described in the context of an aircraft manufacturing and service method 1100 as shown in FIG. 11 and an aircraft 1102 as shown in FIG. 12. During pre-production, exemplary method 1100 may include specification and design 1104 of the aircraft 1102 and material procurement 1106. During production, component and subassembly manufacturing 1108 and system integration 1110 of the aircraft 1102 takes place. Thereafter, the aircraft 1102 may go through certification and delivery 1112 in order to be placed in service 1114. While in service by a customer, the aircraft 1102 is scheduled for routine maintenance and service 1116 (which may also include modification, reconfiguration, refurbishment, and so on). Apparatus and methods embodied herein may be employed during any one or more suitable stages of the production and service method 1100 (e.g., specification and design 1104, material procurement 1106, component and subassembly manufacturing 1108, system integration 1110, certification and delivery 1112, service 1114, maintenance and service 1116) and/or any suitable component of aircraft 1102 (e.g., airframe 1118, systems 1120, interior 1122, propulsion 1124, electrical 1126, hydraulic 1128, environmental 1130).

Each of the processes of method 1100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 12, the aircraft 1102 produced by exemplary method 1100 may include an airframe 1118 with a plurality of systems 1120 and an interior 1122. Examples of high-level systems 1120 include one or more of a propulsion system 1124, an electrical system 1126, a hydraulic system 1128, and an environmental system 1130. Any number of other systems may be included. Although an aerospace example is shown, the principles of the invention may be applied to other industries, such as the automotive industry.

Apparatus and methods embodied herein may be employed during any one or more of the stages of the production and service method 1100. For example, components or subassemblies corresponding to production stage 1108 may be fabricated or manufactured in a manner similar to components or subassemblies produced while the aircraft 1102 is in service. Also, one or more apparatus embodiments, method embodiments, or a combination thereof may be utilized during the production stages 1108 and 1110, for example, by substantially expediting assembly of or reducing the cost of an aircraft 1102. Similarly, one or more of apparatus embodiments, method embodiments, or a combination thereof may be utilized while the aircraft 1102 is in service, for example and without limitation, to maintenance and service 1116. For example, the techniques and systems described herein may be used for steps 1106, 1108, 1110, 1114, and/or 1116, and/or may be used for airframe 1118 and/or interior 1122. These techniques and systems may even be utilized for systems 1120, including for example propulsion 1124, electrical 1126, hydraulic 1128, and/or environmental 1130.

In one embodiment, part 170 comprises a portion of airframe 118, and is manufactured during component and subassembly manufacturing 1108. Part 170 may then be assembled into an aircraft in system integration 1110, and then be utilized in service 1114 until wear renders part 140 unusable. Then, in maintenance and service 1116, part 170 may be discarded and replaced with a newly manufactured part 1116. Robot 150 may be utilized throughout component and subassembly manufacturing 1108 in order to manufacture part 170. Furthermore, robot 150 may be trained to alter its NC program in order to reduce error, via use of end effector 200 and photogrammetric analysis of placed targets 410.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

The invention claimed is:

1. A system comprising:
an end effector of a robot, the end effector comprising:
  an extendable punch that places targets onto a part;
  supports that hold a strip of reflective adhesive tape between the extendable punch and the part, the tape having a reflective side and an adhesive side wherein extension of the punch cuts out a target from the strip and applies force that moves an adhesive side of the target to the part, and retraction of the extendable punch leaves the reflective side of the target visible on the part;
a memory storing a Numerical Control (NC) program directing the robot; and
a controller that directs actuators of the robot to reposition the end effector based on the NC program, wherein the NC program includes instructions for placing a target at each location where the part will be permanently altered.

2. The system of claim 1 wherein:
the controller revises the NC program based on actual locations of the targets.

3. The system of claim 1 wherein:
each target corresponds with a location on the part that will be drilled by the robot.

4. The system of claim 1 wherein:
the end effector takes the place of another end effector that will perform work on the part.

5. The system of claim 1 wherein:
the adhesive tape is removable from the part without damaging the part.

6. A method for controlling a robot via a controller, the method comprising:
identifying, via the controller, locations indicated by a Numerical Control (NC) program that includes instructions for placing a target at each location where a part will be permanently altered;
directing actuators of the robot to reposition an end effector based on the NC program;
placing, via the end effector of the robot, non-destructive marks onto the part at each of the locations indicated by the NC program, wherein placing the non-destructive marks comprises operations selected from the group consisting of: extending a punch that applies removable tape to the part, extending an ink dispenser into contact with the part, and projecting a laser onto the part;
determining actual locations of the marks at the part, based on input from a sensing element;
comparing, via the controller, the actual locations of the marks to desired locations for permanently altering the part; and
determining an accuracy of the NC program based on the comparing prior to permanently altering the part.

7. The method of claim 6 wherein:
the non-destructive marks comprise reflective targets.

8. The method of claim 6 further comprising:
iteratively marking the part at the locations indicated by the NC program.

9. The method of claim 6 wherein:
the non-destructive marks are applied as reflective targets, ink spots, or laser spots.

10. The method of claim 6 further comprising:
directing an actuator to reposition a rigid body of the robot in order to adjust a location of the end effector mechanically coupled with the rigid body to a desired position.

11. The method of claim 6 further comprising:
adjusting the NC program based on the determining; and
applying a new mark at a location indicated by the adjusted NC program.

12. The method of claim 6, wherein:
placing the non-destructive marks onto the target comprises:
drawing a strip of reflective adhesive tape from a supply;
applying tension to the strip;
extending a punch to penetrate through the strip and cut out a target from the strip;
applying an adhesive side of the target to a part while the punch is extended;
retracting the punch behind the strip after applying the target, leaving a reflective side of the target visible on the part; and
drawing additional tape from the supply in response to the punch retracting, enabling the punch to cut out an additional target from the strip.

13. The method of claim 12 further comprising:
removing the target from the part without damaging the part.

14. A non-transitory computer readable medium embodying programmed instructions which, when executed by a processor, are operable for performing a method of operating an end effector of a robot, the method comprising:
identifying, via the controller, locations indicated by a Numerical Control (NC) program that includes instructions for placing a target at each location where the part will be permanently altered;
directing actuators of the robot to reposition the end effector based on the NC program;
placing, via the end effector of the robot, non-destructive marks onto the part at each of the locations indicated by the NC program, wherein placing the non-destructive marks comprises operations selected from the group consisting of: extending a punch that applies removable tape to the part, extending an ink dispenser into contact with the part, and projecting a laser onto the part;
determining actual locations of the marks at the part, based on input from a sensing element;
comparing, via the controller, the actual locations of the marks to desired locations for permanently altering the part; and
determining an accuracy of the NC program based on the comparing prior to permanently altering the part.

15. The medium of claim 14, wherein the method further comprises:
iteratively marking the part at locations indicated by the NC program and determining accuracy of the NC program.

16. The medium of claim 14 wherein:
each target corresponds with a location on the part that will be drilled by the robot.

17. The medium of claim 14 wherein the method further comprises:
replacing the end effector with another end effector that will perform work on the part.

18. The medium of claim 14 wherein the method further comprises:
removing the target from the part without damaging the part.

19. A system comprising:
a robot comprising:
a marking element that applies non-destructive marks to a part, wherein the marking element performs operations selected from the group consisting of: extending a punch that applies removable tape to the part, extending an ink dispenser into contact with the part, and projecting a laser onto the part; and
a controller that directs actuators of the robot to reposition the end effector based on a Numerical Control (NC) program that indicates that permanent alterations will be made on the part, directs the marking element to apply the non-destructive marks at each location where the NC program indicates that permanent alterations will be made on the part, that determines actual locations of the marks at the part, that compares the actual locations of the marks to desired locations for permanently altering the part, and that determines an accuracy of the NC program based on the comparing, prior to permanently altering the part.

20. The system of claim 19 wherein:
the robot further comprises a mark sensing element that detects the locations of the marks on the part.

21. The system of claim 20 wherein:
the controller compares the detected locations with desired locations, and revises the NC program based on the comparison.

22. The system of claim 19 wherein:
the marks are selected from the group comprising: reflective targets, ink spots, and laser spots.

23. The system of claim 19 wherein:
the NC program indicates that each location will be drilled by the robot.

* * * * *